US012748867B2

(12) United States Patent
Westlake

(10) Patent No.: US 12,748,867 B2
(45) Date of Patent: Sep. 29, 2026

(54) SECURE DATA CAPTURE SYSTEMS AND METHODS

(71) Applicant: SYNTEC HOLDINGS LIMITED, Hemel Hempstead (GB)

(72) Inventor: Colin Philip Westlake, London (GB)

(73) Assignee: SYNTEC HOLDINGS LIMITED, Hemel Hempstead (GB)

( * ) Notice: Subject to any disclaimer, the term of this patent is extended or adjusted under 35 U.S.C. 154(b) by 247 days.

(21) Appl. No.: 18/279,738

(22) PCT Filed: Mar. 1, 2022

(86) PCT No.: PCT/GB2022/050540
§ 371 (c)(1),
(2) Date: Aug. 31, 2023

(87) PCT Pub. No.: WO2022/185045
PCT Pub. Date: Sep. 9, 2022

(65) Prior Publication Data

US 2024/0135011 A1 Apr. 25, 2024
US 2024/0232397 A9 Jul. 11, 2024

Related U.S. Application Data

(60) Provisional application No. 63/155,129, filed on Mar. 1, 2021.

(51) Int. Cl.
*G06F 21/60* (2013.01)
*G06F 21/62* (2013.01)

(52) U.S. Cl.
CPC ........ *G06F 21/606* (2013.01); *G06F 21/6245* (2013.01)

(58) Field of Classification Search
CPC ..... G06F 21/60; G06F 21/606; G06F 21/6245
(Continued)

(56) References Cited

U.S. PATENT DOCUMENTS 6,885,736 B2 * 4/2005 Uppaluru ............ H04M 3/4938 709/219
7,912,917 B2 * 3/2011 Chakra ................ G06F 40/174 709/217
(Continued)

FOREIGN PATENT DOCUMENTS

WO WO 2013/067121 A1 5/2013
WO WO 2016/092331 A1 6/2016
WO WO 2020/222009 A1 11/2020

OTHER PUBLICATIONS

PCT Written Opinion of the International Preliminary Examining Authority, PCT Application No. PCT/GB2022/050540, Feb. 6, 2023, six pages.
(Continued)

*Primary Examiner* — Liang Che A Wang
(74) *Attorney, Agent, or Firm* — Fenwick & West LLP

(57) ABSTRACT

Methods comprising steps for processing data for a customer-agent interaction are disclosed, as well as systems configured to perform such steps. These steps may comprise retrieving a web form comprising one or more elements, from a web server, using a first device; displaying the web form to the agent via a browser running on the first device; detecting, by the first device, an interaction of the agent with a first element in the web form; modifying the web form using a program running in the browser; generating a submission from the web form; and transmitting the submission to a service provider.

19 Claims, 5 Drawing Sheets

(58) Field of Classification Search
USPC .................................... 726/26; 709/218, 219
See application file for complete search history.

(56) References Cited

U.S. PATENT DOCUMENTS

| | | | | |
|---|---|---|---|---|
| 10,270,865 | B1 * | 4/2019 | Heath | H04L 67/146 |
| 11,621,060 | B1 * | 4/2023 | Mirza | G16H 10/60<br>382/116 |
| 2003/0142809 | A1 * | 7/2003 | Coffey | H04M 3/5158<br>379/265.01 |
| 2018/0300500 | A1 * | 10/2018 | Chen | H04L 67/02 |
| 2021/0158238 | A1 * | 5/2021 | Clearwater | G06F 21/6245 |
| 2021/0182750 | A1 * | 6/2021 | Brannon | G06F 21/577 |

OTHER PUBLICATIONS

PCT International Search Report and Written Opinion, International Application No. PCT/GB2022/050540, dated May 23, 2022, 8 Pages.
International Preliminary Report on Patentability, International Application No. PCT/GB2022/050540, dated May 31, 2023, 31 Pages.

* cited by examiner

FIG. 5
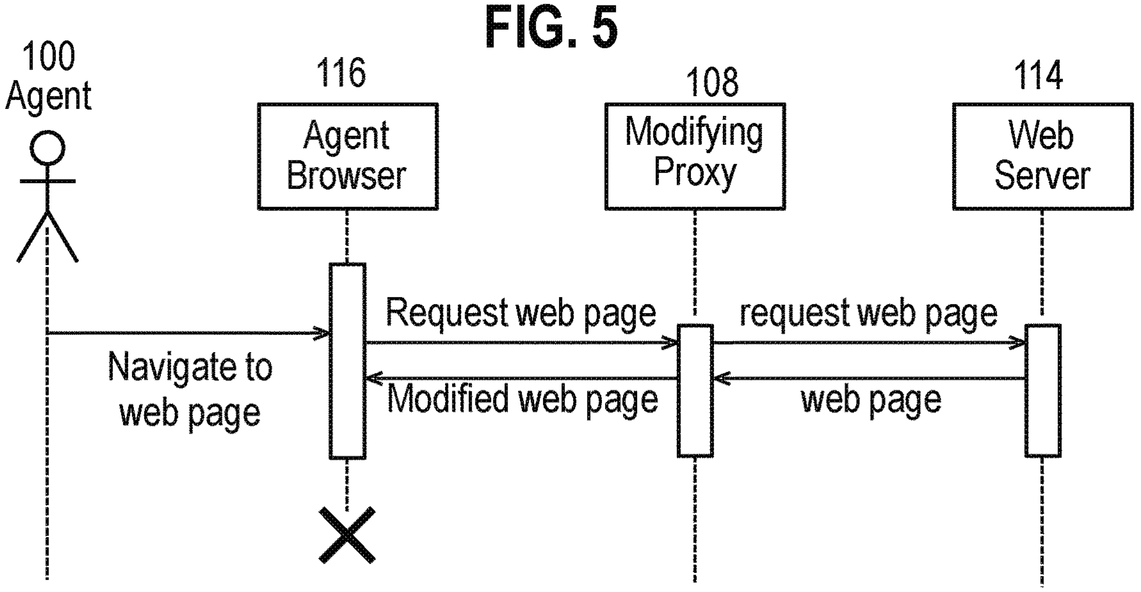
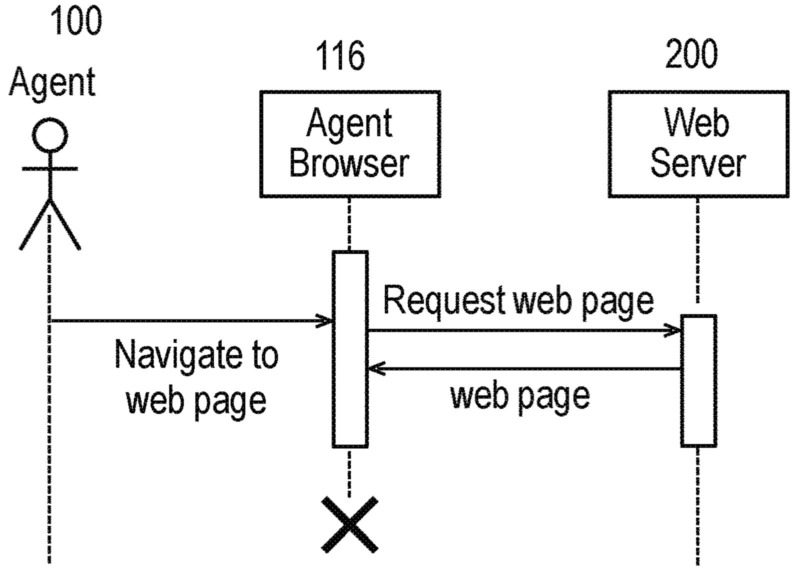
FIG. 6
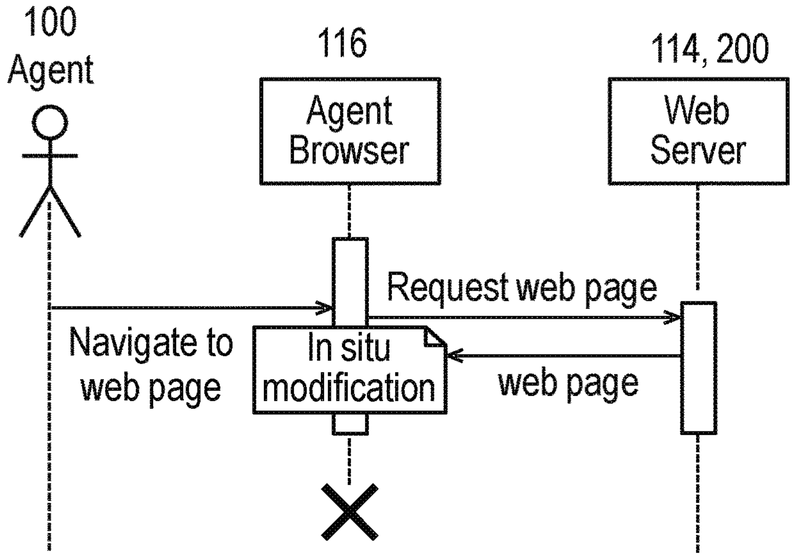
FIG. 7

SECURE DATA CAPTURE SYSTEMS AND METHODS

This application is a national phase of International Application No. PCT/GB2022/050540, titled "SECURE DATA CAPTURE SYSTEMS AND METHODS," filed on Mar. 1, 2022, which claims the benefit of U.S. Provisional Application No. 63/155,129, filed on Mar. 1, 2021, the contents of both of which are hereby incorporated by reference herein in its entirety.

TECHNICAL FIELD

The invention relates to data capture systems and methods.

BACKGROUND

Contact centres that take payment over the telephone often install solutions that allow them to take payment from their customers securely without revealing the customer's card or bank data to the contact centre agent. These systems typically function by having an ASR (automatic speech recognition) or DTMF capture facility inserted into the voice stream which captures the card data at the edge of the contact centre operator's network. This data is them temporarily stored until the agent triggers a payment authorisation request to a PSP (Payment services provider) when it is inserted into the request as required.

Many contact centres use Hosted Payment Pages (HPPs) which are basically web pages served by their PSPs for agents to take payment from customers over the telephone. Particularly with outsourced contact centres, there is also a use case where the agent may need to make payment on behalf of customers on ad-hoc 3rd party web sites. In this situation the system needs to be able to deal with payment pages without pre-configuration.

Traditional solutions to the HPP use case are to arrange for the payment page requests pass through a modifying proxy by one of three possible mechanisms 1. By configuring the payment proxy as the default proxy for the agent's PC thus handling all browser requests
2. By making special Hosts file or local DNS entries listing the proxy IP address as the address for any sites of interest and adding certificates to the agent's PC trust store. The certificates are required because, in order to inspect and modify the payload to insert the card data, the proxy must decrypt the traffic and it must therefore serve a self-signed certificate purporting to belong to the site in question and have this trusted by the agents browser.
3. By changing the URL that the agent uses to access the HPP to be another URL that points to the proxy while identifying the desired ultimate target of the request i.e. the PSP.

These conditions are inconvenient and may conflict with other business requirements. In addition to a certificate for each site to be handled (or a cert with multiple Subject Alternative Names), the approaches generally require site specific modifications to the payment page code which is both time consuming and fragile. Because the HPP code is under the control of a third party they might make modifications which break the integration.

FIG. 5 depicts a proxy modifying a payment page requested by an agent. To do this the proxy will parse the HTML code to choose the correct places to insert or modify code. The proxy must also be located between the browser and the web server.

When the web app is served internally (as depicted in FIG. 6), it would not be possible to insert the modifying proxy between the browser and the web server without it being located within the merchant's network, which would defeat the point of the system as the merchant's network would remain in PCI scope.

SUMMARY OF THE INVENTION

Embodiments of the invention may be performed in the context of a system wherein a customer communicates with an agent by means of one or more channels including but not limited to voice or web chat.

According to an embodiment of the invention there is provided a system providing means to: capture from the communication information input by the customer by means of a data capture server situated in the communications data stream and allow the agent to choose an input element within a web form for a particular action.

The name of the input element may be stored (in memory, disk or otherwise) and may be sent to a server.

A signal may be sent to a server to invoke a capture of data from a discrete input source.

The input element may be automatically populated with data obtained from the discrete input source.

The input element may be automatically populated with fixed data conforming to validation rules enforced by code running in the web page or otherwise applied to the input element.

The input element may be automatically populated with a dynamically generated token formatted to conform to validation rules enforced by code running in the web page or otherwise applied to the input element, the token being generated either in the web browser itself or in a separate system remote from the browser.

The chosen input element may be hidden from display after the choice.

Another input element may be used for visual feedback of data capture progress which is inserted into the web page in the place of the chosen input element. The visual feedback may include a redacted version of the data entered by the customer and may be updated in real time as the customer keys the information.

The system may operate in a number of modes when the web form is submitted.

In a first mode, when the web form is submitted the form data submission request is redirected from its original destination to a second server by code running in the browser, the second server making a new request to the original destination having modified data in the submission to include data captured from a discrete input source.

The redirected data submission may include data identifying to the second server and the original destination of the request.

The redirected data submission may include data identifying to the second server the data to be modified, which may be a subset of the whole data sent in the request.

The redirected request may include headers such as cookie headers that may have been sent as part of the original request.

When the original destination server replies to the request from the second server, the second server responds to the original request from the web browser with the response it receives, optionally modifying the response e.g. by the addition, modification or removal of response headers.

In a second mode, when the web form is submitted no redirection is initiated in code, but DNS or proxy settings applicable to the agent's computer or PC cause the submission to pass to a second server which then acts as in the first mode described above.

In a third mode, when the web form is submitted the submission request proceeds normally and sends the form data to its normal destination, optionally where that destination is an intermediate system (such as a back office system), the destination server may decide to route the request either direct to its ultimate destination or through an intermediate server which performs the data modification steps outlined in the first mode above, that decision being optionally predicated on inspection of the submitted data.

The mechanism to allow the agent to choose the web form input element may be a context menu.

The act of the agent choosing web form elements, may subsequently include making a transaction and automatically adding to a central store information used to identify the page in question as a payment page thus allowing this information to be disseminated to other agent web browsers for subsequent automatic recognition of payment pages.

The system may include means for detecting that the page being visited or one of its sub-frames is a payment page where the names of the relevant form elements are known from previous interactions, thus allowing the functions of the context menu to be replaced by alternative means facilitated by the dynamic injection of code such as by clicking on the relevant fields in the web form or by means of other control elements such as buttons dynamically inserted into the page.

The capture of data from a discrete input source may be replaced by the retrieval from a data store of data required to complete the transaction.

The data capture method may be by DTMF tones and the discrete source is a telephone conversation between a customer and the agent.

The data capture method may be automatic speech recognition and the discrete source is a telephone conversation between a customer and the agent.

The data capture method may be a web form completed by the customer using their own device.

The data capture method may be an application running on the customer's own device.

A link to a web form may be sent to the customer to enable them to complete said information request and supply the information to the system to pass onwards to an authorising entity without the agent being aware of said information. This may be used in the event that the payment process requires extra security information (e.g. 3DS system) to complete the transaction.

The link to the web form may be passed by SMS (for capture and or 3DS).

The URL of the web form may be passed to the customer by the agent verbally (for capture and or 3DS).

The link to the web form may be passed by another channel such as a web chat session (for capture and or 3DS).

Invoking a context menu on a field containing an email address may cause an email to be sent to that address containing a web link to a form constituting the discrete input source thereby allowing the customer to enter information which may be later used in a data submission request.

The redirected request may contain information to enable correlation of the request with the discrete input source.

A fixed correlator may be used such the agent has a fixed identifier which is sent both in the request to the second server and also (either simultaneously or beforehand) via the discrete input channel to the data capture server.

The fixed identifier may be stored in the agent's browser as a cookie, preferably in the domain of the second server, and sent to the second server with the redirected request.

The fixed identifier may be stored in the agent's browser by any other means, and sent to the second server with the redirected request as a header or in the body of the request.

The communication may be by voice and the fixed identifier is sent to the data capture server in the form of DTMF.

The communication may be by voice and the fixed identifier is sent to the data capture server in the form of a SIP message (e.g. INFO or MESSAGE).

The communication may be by web chat and the fixed identifier is sent as meta-data in the data stream.

A dynamic correlator may be used such the correlation id (i.e. correlationId) changes for each interaction. It may be generated by any component in the communication stream and will be available both to the data capture server and the agent's browser. The token generation scheme used in the browser as described above may be configured to use the correlationId as part of the input to the token generation function.

In the context of CTI integration, means may be provided to send data relating to a communications interaction between a web page providing the agent communications platform GUI or a desktop program for the same purpose, and the system described above may provide the web browser context menu, token generation and data substitution.

According to a further embodiment of the invention there is provided a computer implemented method comprising the steps of receiving communication information input by a customer, optionally from a data capture server/device, and receiving a selection of an input element within a web form for a particular action.

According to a further embodiment of the invention, there is provided a computer-implemented method of processing data in a customer-agent interaction, the method comprising the steps of: retrieving a web form comprising one or more elements, from a web server, using a first device; displaying the web form to the agent via a browser running on the first device; detecting, by the first device, an interaction of the agent with a first element in the web form; modifying the web form using a program running in the browser; generating a submission from the web form; and transmitting the submission to a service provider.

Optionally, the method comprising capturing, using a data capture means, communication information input by the customer; wherein transmitting the submission to the service provider comprises redirecting the generated submission via a proxy device, the proxy device configured to: modify the redirected submission to include the captured communication information; and forward the modified submission to the service provider.

The original destination of the submission may be associated with the service provider. In such cases, redirection of the generated submission via the proxy device may be either: directly initiated by the program running in the browser, or initiated by predetermined DNS and/or proxy settings of the first device, or initiated by the program running in the browser, by dynamically controlling DNS and/or proxy settings of the first device.

The original destination of the submission may be associated with a backend server configured to either: forward the submission to a destination associated with the service provider; or to transmit the submission to the service provider via the proxy; or, based on an inspection of the submission, to either forward the submission to a destination associated with the service provider or transmit the submission to the service provider via the proxy.

Modifying the web form may comprise removing one or more of the elements of the web form. Modifying the web form may comprise hiding, obscuring or modifying one or more of the elements of the web form to prevent the agent from determining data held or input therein, optionally including the first element. Modifying the web form may comprise pre-populating one or more of the elements of the web form with values, optionally including the first element. In the latter case, modifying the web form may comprise pre-populating the first element with a value formatted to conform to one or more validation rules or checksums of the web form or backend server. In any of these cases, said modification of the web form may occur prior to displaying the web form to the agent.

Modifying the web form may comprise modifying one or more of the elements of the web form in response to the detected interaction, optionally including the first element. Modifying an element may comprise inserting a value into said element, wherein said value comprises one or more of: a value formatted to conform to one or more validation rules or checksums of the web form or backend server; a unique token; or the captured communication information, optionally wherein the captured communication information has been made unviewable by the agent. The detected interaction may be with a context menu provided for the first element by the program running in the browser. Modifying the web form may comprise pre-populating the first element with a unique token.

Modifying the web form may comprise modifying one or more of the elements of the web form to show feedback indicative of the progress of the capturing of communication information. In such cases, said feedback may comprise an indication of either: a number of spoken utterances input by the customer; or a number of SIP signals input by the customer; or a number of DTMF key presses input by the customer; or a number of computer-readable characters entered by the customer.

Optionally, the proxy device adds the captured communication information to the submission based on matching said captured communication information with a header found in the submission received by the proxy device. Optionally, the proxy device adds the captured communication information to the submission based on matching said captured communication information with the unique token, the unique token being included in the content of the submission.

The proxy device may receive a response from the service provider and forward to response to the browser, optionally wherein the proxy device modifies one or more headers of said response.

According to a further embodiment of the invention, there is provided a device, or system of devices, configured to execute the method of any one of the methods disclosed herein.

According to a further embodiment of the invention, there is provided a computer program comprising instructions which, when the program is executed by a computer, cause the computer to carry out any one of the methods disclosed herein.

BRIEF DESCRIPTION OF THE FIGURES

Embodiments of the invention will be described, by way of example, with reference to the following figures, in which:

FIG. 5 illustrates an example in which an agent accesses a web page served by a web server (which may be a service provider “external” to the agent’s network) via their browser;

FIG. 6 illustrates an example in which an agent accesses a web page served by a web server (which may be an “internal” server of the agent’s network, e.g. a backend server) via their browser; and FIG. 7 illustrates in-situ modification within an agent’s browser of a web page received from a web server.

DETAILED DESCRIPTION

Instead of contriving or arranging for all traffic directed to the PSP to pass through the proxy, the inventor has found that an alternative solution can be constructed by creating browser extensions that inject code and data into a web page and modify the page submission request when the agent clicks the ‘pay’ button by adding extra data in headers to enable the location of relevant fields within the submission payload and redirecting the request to a payment proxy which has been programmed to be able to utilise that data to modify the submission payload in the required manner. When used in conjunction with a data capture device which is inserted in the communications path between the customer and agent, this allows data captured from one communications channel—that between the customer and the agent to be inserted into a separate communication—that between the agent and the payments system. Communication between the customer and agent can be by voice, web chat or any other means which can be intercepted by a device suitably placed within the data stream. Not only does this arrangement avert the aforementioned issues characteristic of the existing systems but it also has the advantage, because it is only invoked on demand, of greatly reducing the amount of web traffic flowing through the proxy.

Figure 1:
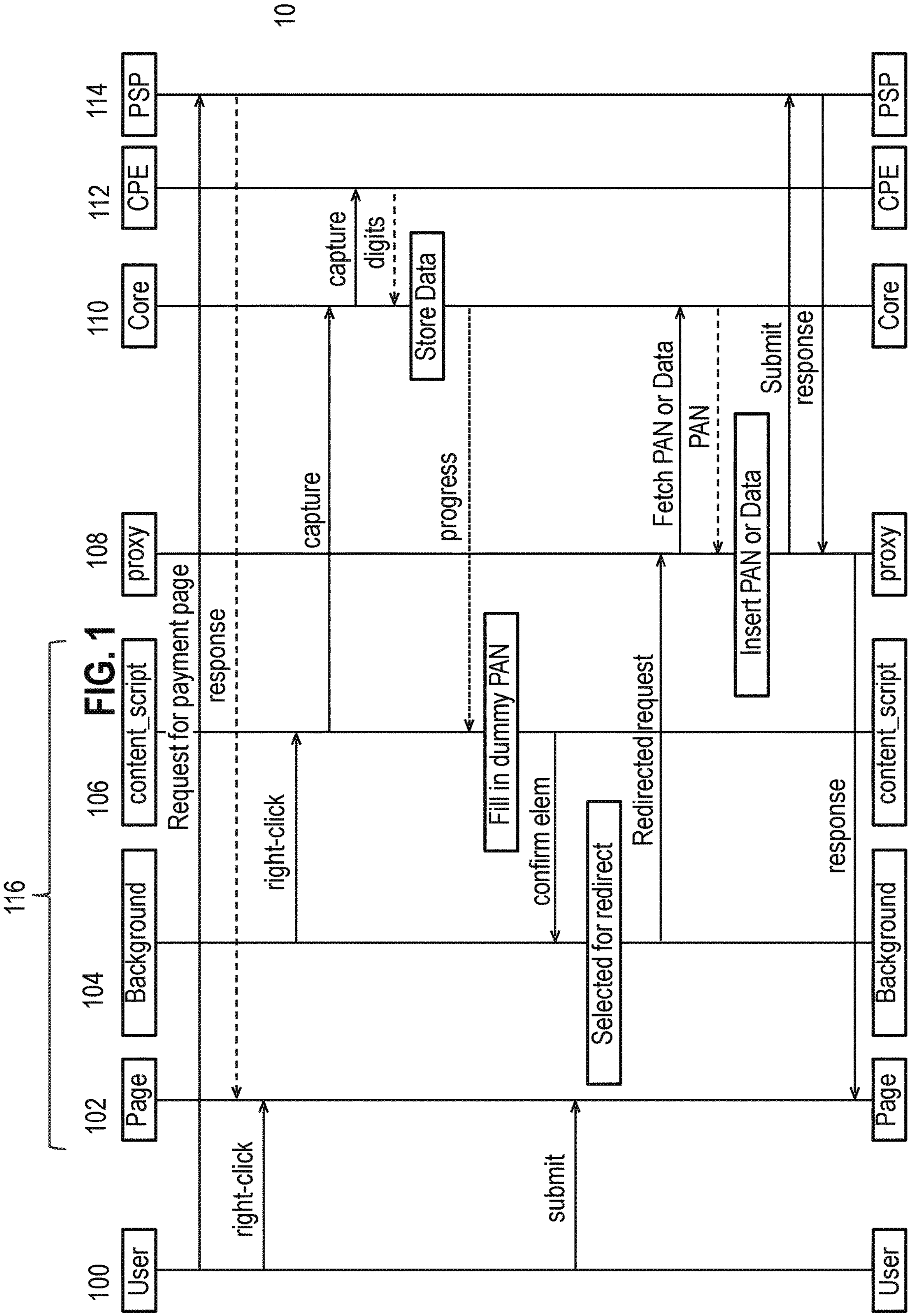
FIG. 1 illustrates a data capture process according to an embodiment of the invention.

In FIG. 1, the CPE denotes the data capture device and the ‘Core’ denotes both a temporary store of card data and a consolidation point for data exchange with multiple customer premises equipment (CPE) devices. In practice the Core and Proxy may be services running on the same server and may even be provided by different parts of the same program. In the diagram ‘Page’, ‘Background’ and ‘content_script’ are all running in a browser of an agent’s computer or workstation.

Figure 2:
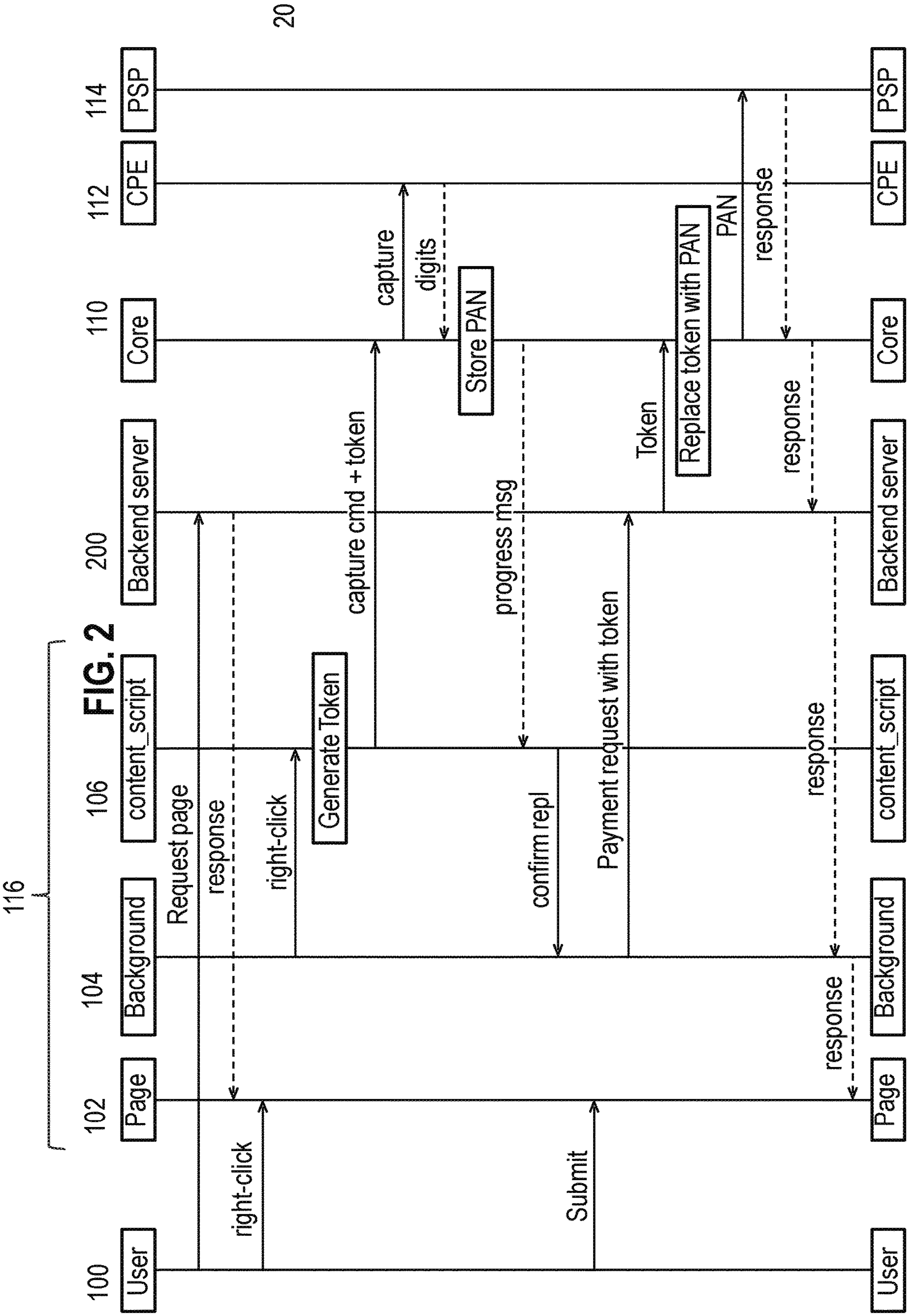
FIG. 2 illustrates a data capture process according to another embodiment of the invention.

In FIG. 2, the payment page is served internally by the merchant’s backend server. This may be a page in a client relationship management (CRM) or enterprise resource planning (ERP) system or suchlike. To avoid the need to integrate with the CRM system by modifying its code a similar approach can be used, but without the need for redirects. In this case, instead of putting a dummy permanent account number (PAN) in the card number field, either the background or content_script can generate a one time token which the core and or CPE associate with the PAN once it has been captured. The page can then submit this token to the backend server in place of the PAN which can then send it to the PSP via the core that acts in a modifying proxy capacity (here the functions of the proxy and core have been coalesced into a single entity in the diagram for the sake of simplicity) inserting the PAN in place of the token before sending to the PSP for processing.

According to the methods described with reference to FIGS. 1 and 2, simple and intuitive control of the secure data capture system can be achieved for the agent without any modifications to the code of the merchant's systems, the only change being a configuration change to the backend server for the PSP submission URL.

The system has been illustrated as being that of credit or debit card payments, but the same approach can be used for any data that can be captured by an ASR or DTMF system, including bank details, social security numbers, membership numbers, healthcare policy numbers etc. In addition, the communications channel has been described with reference to the voice channel, but the methods described herein may be applied to any other communications channel that an agent may use to communicate with a customer, e.g. web chat.

Figure 3:
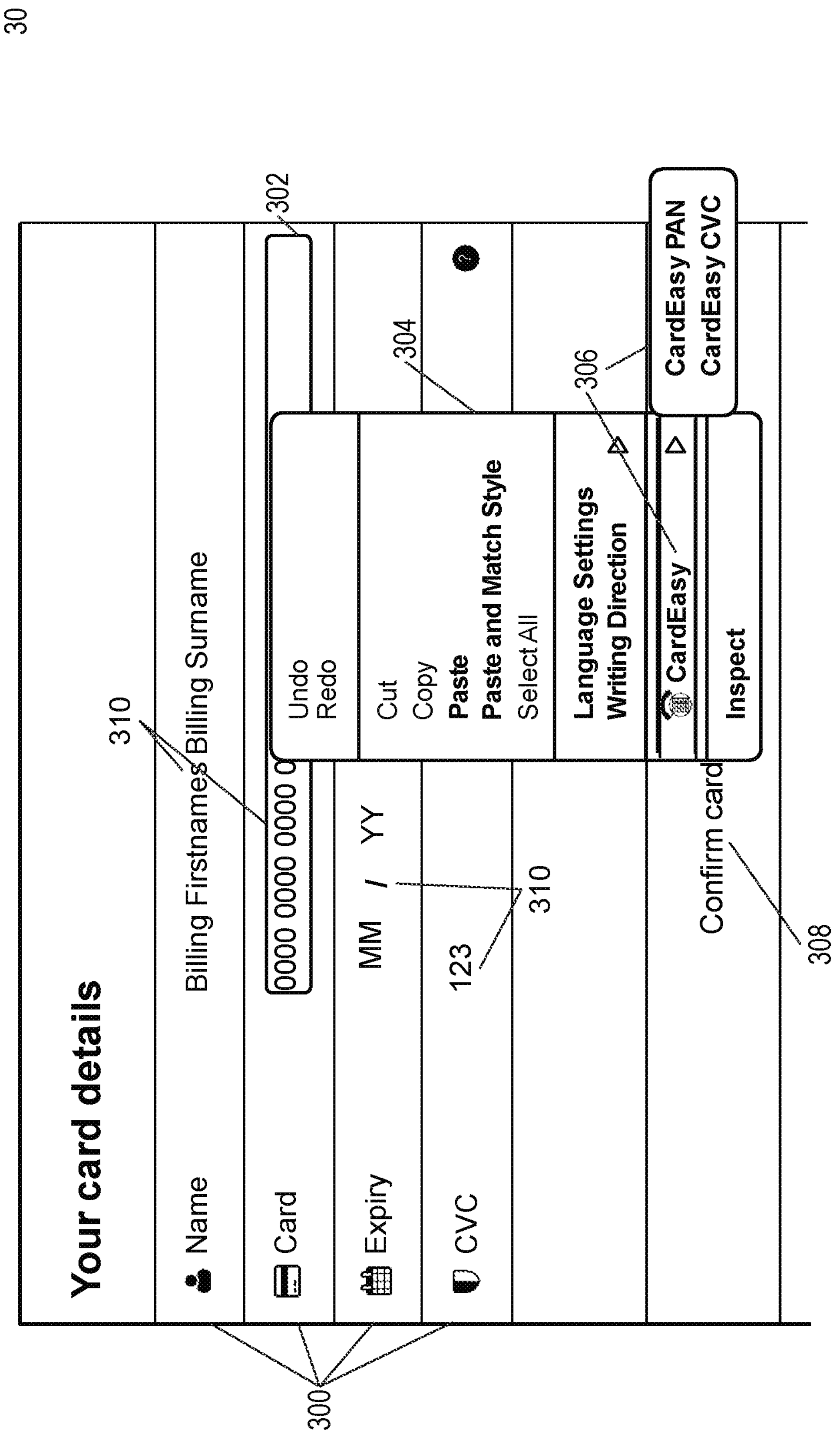
FIG. 3 illustrates a user interface or graphical user interface (GUI) with a browser extension supplying a context menu for the control of a data capture device.

In FIG. 3, there is illustrated a user interface or GUI in which there is included a browser extension supplying a context menu for the control of a data capture device.

Figure 4:
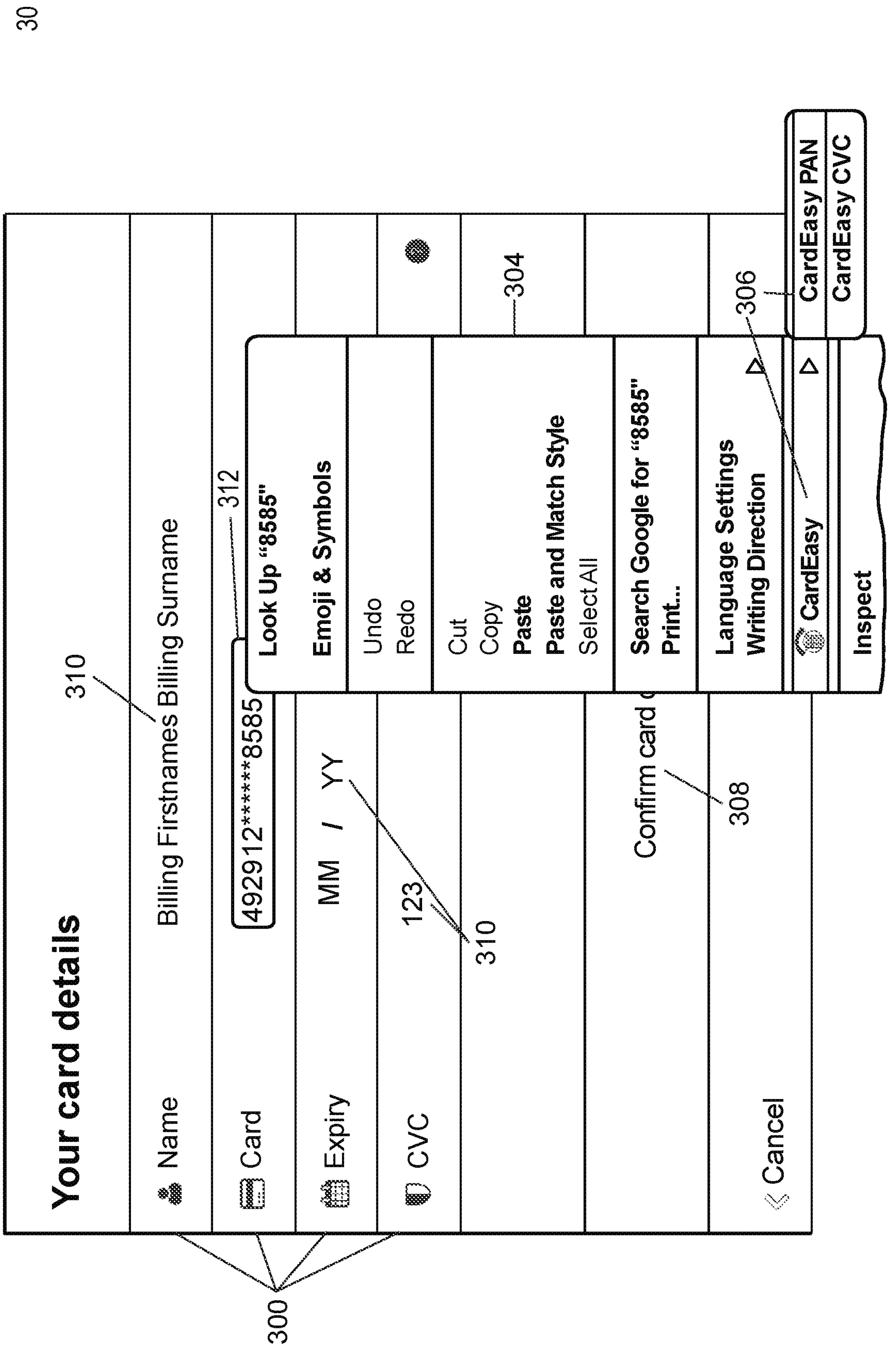
FIG. 4 illustrates a user interface or GUI in which an original PAN input field is hidden by the browser extension and an overlay is provided showing redacted live digit by digit feedback as the customer keys in their card number.

In FIG. 4, there is illustrated a user interface or GUI in which an extension hides the original PAN input field and provides an overlay showing redacted live digit by digit feedback as the customer keys in their card number.

FIG. 1 depicts an interaction 10 between user 100 (e.g. an agent), browser 116, proxy device 108, core entity 110, data capture means 112 (in this example, customer premises equipment (CPE)), and a payment service provider 114. Browser 116 may generally comprise several components, aspects and/or modules (in this case, page 102, background script (also known as a service worker) 104 and content_script 106). A browser may generally comprise code, software, computer programs or modules thereof configured to add functionality to the browser. One of such aspects may be referred to as a "browser extension" or simply an "extension". An extension may be configured to dynamically inject code (e.g. HTML) or data into a web page and/or web form.

As can be seen, in the example of FIG. 1 a web page (in this case a payment page) is served by service provider 114 to browser 116. Agent 100 interacts with a first element of page 102 (e.g. an input element) by right-clicking on it, though it will be understood that a wide range of possible alternative types of interaction of a user with an element of a web page or web form are possible, e.g. left-clicking, entering text or input commands via a keyboard, making gestures with a mouse, trackball, trackpad or touchscreen, selection of fields, or combinations of any of these interactions.

In the example of FIG. 1, the right click event triggers the capture of communication information input by a customer, though in practice this information may be captured at another suitable time, not necessarily in response to the agent's interaction with the web page or web form. In this example, the captured information comprises digits, though it will be recognized that other types of information may be captured. The browser is provided with data indicative of the capture progress in the example of FIG. 1, which may be particularly beneficial for helping the agent carry out the interaction with the customer and system, though such an indication of progress is not necessary to work the present invention.

In the example of FIG. 1, a dummy PAN is entered into an element of the web form. The dummy PAN may be selected, generated or otherwise configured to pass validation or formatting rules, e.g. a checksum, a Luhn check or any other appropriate validation rule known to those skilled in the art. In some embodiments, this may be a fixed value. In other embodiments, it may be a unique token assigned for the agent, the customer, the communication channel, the communication session, or any other suitable identifying parameter, to enable the captured data to be matched up against the submitted web form by proxy device 108.

In the example of FIG. 1, the data being captured and added to the form submission is a PAN. However, any suitable data may be captured and added to the form submission according to the present invention, e.g. a CV2 number or another type of data.

FIG. 2 depicts an interaction 20 between user 100, browser 116, proxy device 108, core entity 110, data capture means 112, and a payment service provider 114. Interaction 20 is similar to interaction 10, but in this case the web form/page is served by a backend server 200. Backend server may be an "internal" server, in the sense that it is part of a network along with the device being used by agent 100 to access the page via their browser. Backend server 200 may be located within a PCI-DSS boundary along with the agent's device. Backend server 200 may be configured to interact with service provider 114 in a server-to-server fashion, e.g. via an API. Backend server 200 may be configured to process web form submissions from browser 116 and may enforce formatting rules on the data those submissions contain.

As can be seen, in interaction 20, browser 116 substitutes a unique token in place of the PAN within the submitted payment request, which is subsequently used by core 110 (acting as the proxy device) to correlate the submitted request with the appropriate data capture and "fill in" the missing PAN before submitting the complete request to service provider 114. Using the unique token in this way can be particularly advantageous in settings such as that depicted in FIGS. 2 and 6 (where the request is submitted to an internal/backend server), since no modification of headers is required to enable a submission to be eventually matched to the captured information—all of the necessary information is contained in the submission payload itself.

FIG. 3 depicts at least a portion of a web form 30. Web form 30 comprises several elements 300, with which the agent can interact to input data. Greyed-out "guide" text 310 is provided inside each of elements 300 to assist the user in this interaction by illustrating the format the inputted data is expected to take. It should be noted that text 310 is not "real" data that has been input into elements 300, but merely a cosmetic feature of these elements configured to assist the agent.

Web form 30 comprises at least one input element 302 with which a user may interact. This interaction may be a straightforward inputting of data, e.g. inputting a PAN or other alphanumeric data via an input device such as a computer keyboard. However, in embodiments of the present invention, the user may be enabled to interact with element 302 by accessing a context menu 304. As used herein, a "context menu" for a page or form refers to a graphical element displayed when a user (the agent) interacts with the page or form to select a functionality from a list, where the contents of said list are determined based on the part, aspect or element of the page or form with which the user interacted.

Providing both the "usual" functionality of element 312 and the context menu functionality may allow for backwards compatibility of web form 30.

The context menu may be provided by the browser, and optionally may be modified by the browser extension. Alternatively, the context menu may be provided by the browser extension. Context menu 304 in the embodiment shown in FIGS. 3 and 4 is activated when the page, web form or an element thereof is right-clicked (i.e. selected) by the agent, and offers a capture functionality 306 provided by the browser extension, which the agent can use to trigger the capture of PAN data from the customer-agent communication, using the data capture device.

Web form 30 further comprises an element 308 configured to submit the form and its data to a destination when clicked; however, it will be understood that such an element is not a necessary requirement of web form 30, which may trigger a submission on any suitable event including but not limited to a key press (e.g. the "enter" key), the completion of any or all of elements 300, a detection that the contents of elements 300 meet a formatting rule, an interaction with a particular element such as element 302 (e.g. clicking, interacting with context menu 304 and/or option 306, and so forth), or the completion of a data capture.

FIG. 3 shows context menu 304 comprising options 306 for inserting a PAN or a CVC number into element 302. In one embodiment, the agent may be able to interact with element 302 and/or with a context menu 304 thereof to re-use a PAN. For instance, context menu 304 may display a third option 306 (not shown) reading "Reuse PAN". In this embodiments, when a PAN is captured, it becomes associated with meta-data for the customer-agent interaction. For example, where the customer-agent interaction is a telephone call, the captured PAN may be associated with the SIP call-Id. In general, the meta-data with which the PAN is associated may comprise a unique identifier for the customer-agent interaction, such as the dynamic correlators or unique tokens described in more detail elsewhere herein.

When the agent visits another web page, the browser extension may perform a lookup in its configuration to determine whether the new page is on the "allow" list for the PAN reuse feature and, if it is, enable the context menu for this function.

In any case, upon selection of this "Reuse PAN" option by the agent, the token or dummy PAN value is inserted into element 302 (or, alternatively, element 302 is hidden and a placeholder field such as element 312 is displayed containing a redacted version of the "remembered" PAN that was saved from the original capture—this may be beneficial for visual feedback purposes). When the web form is submitted, the same process as in the other embodiments is followed, including submission through the proxy, and the original PAN being inserted "on the fly".

In the above embodiment, if the second site requires CV2 then this may be recaptured before clicking the pay button, as it is against PCI-DSS regulations to store CV2 after authorisation. The core 110 may therefore be configured always to delete the CV2 from memory as soon as it is used.

The stored PAN may be deleted from core 110 at the end of the call.

FIG. 4 shows a similar view of form 30—however, in this figure, the browser extension has hidden element 302 from view and replaced it with a new element 312 comprising a dummy and/or token value or a portion of the real value.

FIGS. 5 and 6 show typical architectures employed in the present technical field. FIG. 7 depicts a solution according to the present invention which is designed to resolve problems with prior approaches in the art. A browser extension that modifies the page without the need for a proxy will work both for internal and external sites. Also, because it uses the agent to identify the input field to act on for insertion of a token or fixed dummy card number, it is less prone to fragility caused by changes in the page code, and in many cases can be used on new web sites without prior configuration.

For internal sites, the unique token is preferred over the fixed dummy card number as the latter approach requires extra headers to be sent with sufficient information to identify the call and this would require modification of the server code. In other words, it may be desirable to use a dynamic token instead of a fixed placeholder, because in this configuration, the merchant would have to make code changes to send extra headers needed for call correlation. Using a dynamic token allows the token to be used to identify the call so the extra headers are not needed. With external sites, either approach can be used.

Because systems that rely on proxies to modify page code must, by necessity, be located between the web server and the browser, they cannot conveniently be used with internally served pages (FIG. 2) without the proxy being located within the merchant's network, which defeats the purpose of using the proxy.

In the prior art, the proxy device generally is required to be between the PSP (or, in the case of internal sites, backend server) and the browser, as it is this proxy device which substitutes the real card data before submitting to the PSP. An exception to this is where real card data is inserted in the input field, but it is rendered invisible to the agent. This is possible because one can populate the input field with sensitive data and at the same time hide it so that the agent cannot see it; that is, visibility can be controlled separately from content. This solution leaves the agent's browser in scope for PCI, but still "descopes" the voice network from PCI-DSS scope. In this instance, no proxy is required at all.

In FIG. 2, the payment page could be part of an internal CRM or ERP system. In various embodiments, the service provider may be a third-party server or site which itself is configured to forward data to another service provider. A third party site may serve a page of the other service provider to an agent's browser via an iFrame element.

In embodiments having an internal backend server, the backend server may determine whether or not to redirect a submission via the proxy based on an inspection of the submission. This may enable backwards compatibility with existing systems ("dual working"), which may be beneficial during initial deployment of the invention.

The act of an agent interacting with a field by means of an action (e.g. a context menu click) could record information which is subsequently automatically disseminated to the browsers of other agents, 'teaching' them how to behave on the page in question (i.e. to automatically recognize the PAN field and make it clickable to invoke a capture, or perhaps just to highlight it).

In summary, the present invention provides a computer-implemented method of processing data in a customer-agent interaction, the method comprising the steps of:

retrieving a web form comprising one or more elements, from a web server, using a first device;

displaying the web form to the agent via a browser running on the first device;

detecting, by the first device, an interaction of the agent with a first element in the web form;

modifying the web form using a program running in the browser;

generating a submission from the web form; and transmitting the submission to a service provider.

The web server may be either an (internal) backend server or an (external) service provider. The agent's interaction with the first element may trigger the capture of data from the customer-agent interaction. The submission may be sent and/or generated in response to the agent interacting with the first element, or any other element of the web form. The generated submission may include, or be based on, information inserted into the first element and/or any one or more of the other elements of the web form. The service provider may be a payment service provider. Communication information captured by data capture means according to the present invention may be sensitive information. Destinations said to be "associated with" an entity may comprise a URL of that entity. Matching captured communication information to a submission may be achieved based on various aspects of a customer-agent interaction including but not limited to a session ID, agentID, callerID, or phone number or the like; or CTI data or the like. In the context of CTI integration, means may be provided to send data relating to a communications interaction between a web page providing the agent communications platform GUI or a desktop program for the same purpose, and the system described above may provide the web browser context menu, token generation and data substitution.

The data capture means may be a data capture server or any other data capture device as will be known to those of ordinary skill in the art, including but not limited to devices configured to capture telephony data (including signaling data such as SIP signals and/or audio data such as sound or DTMF data), SMS data, computer-readable data in transit through a network (e.g. via a data link layer of the TCP/IP stack as known to those skilled in the art) or any other kind of data capturable from the communication channel.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, hard-drives, thumb drives, memory cards, etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP (Digital Signal Processor), programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual steps may be deleted from any of the methods without departing from the spirit and scope of the subject matter described herein. Aspects of any of the examples described above may be combined with aspects of any of the other examples described to form further examples without losing the effect sought. Any of the steps or processes described above may be implemented in hardware or software.

It will be understood that the above descriptions of preferred embodiments are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A computer-implemented method of processing data in a customer-agent interaction through a voice communication channel, the method comprising steps of:

retrieving a web form comprising one or more elements, from a web server, using a first device;

displaying the web form to the agent via a browser running on the first device;

detecting, by the first device, an interaction of the agent with a first element in the retrieved web form, the first element configured to receive sensitive data from a customer, wherein the interaction automatically triggers a capture from the voice communication channel, responsively to the detected interaction, using a data capture means in the voice communication channel between the customer and the agent, of communication information comprising telephony data, SMS data, or computer-readable data input by the customer;

modifying one or more elements of the web form in response to the detected interaction, using a browser extension;

generating a submission from the web form; and transmitting the submission to a payment service provider for processing.

2. The method of claim 1, wherein transmitting the submission to the payment service provider comprises redirecting the generated submission via a proxy device, the proxy device configured for:
modifying the redirected submission to include the captured communication information; and
forwarding the modified submission to the payment service provider.

3. The method of claim 2, wherein an original destination of the submission is associated with the payment service provider, wherein redirection of the generated submission via the proxy device is either:
directly initiated by the browser extension, or
initiated by predetermined DNS and/or proxy settings of the first device, or
initiated by the browser extension, by dynamically controlling DNS and/or proxy settings of the first device.

4. The method of claim 2, wherein an original destination of the submission is associated with a backend server, the backend server either:
configured to transmit the submission to the payment service provider via a proxy based on an inspection of the submission; or
configured to forward the submission to a destination associated with the payment service provider, based on an inspection of the submission.

5. The method of claim 2, wherein the proxy device either:
adds the captured communication information to the submission based on matching said captured communication information with a header found in the submission received by the proxy device; or
receives a response from the service provider and forwards the response to the browser, wherein the proxy device modifies one or more headers of said response.

6. The method of claim 2, wherein the proxy device adds the captured communication information to the submission based on matching said captured communication information with a unique token, the unique token being included in a content of the submission.

7. The method of claim 1, wherein an original destination of the submission is associated with a backend server configured to forward the submission to a destination associated with the payment service provider.

8. The method of claim 1, wherein modifying the web form comprises removing one or more of the elements of the web form.

9. The method of claim 1, wherein modifying the web form comprises hiding, obscuring or modifying one or more of the elements of the web form to prevent the agent from determining data held or input therein.

10. The method of claim 1, wherein modifying the web form comprises pre-populating one or more of the elements of the web form with values.

11. The method of claim 10, wherein modifying the web form comprises pre-populating the first element with a value formatted to conform to one or more validation rules or checksums of the web form or backend server.

12. The method of claim 10, wherein modifying the web form comprises pre-populating the first element with a unique token.

13. The method of claim 1, wherein the modified one or more of the elements of the web form includes the first element.

14. The method of claim 1, wherein modifying an element comprises inserting a value into said element, wherein said value comprises one or more of:
a value formatted to conform to one or more validation rules or checksums of the web form or backend server;
a unique token; or
the captured communication information, wherein the captured communication information has been made unviewable by the agent.

15. The method of claim 1, wherein the detected interaction is with a context menu provided for the first element by the browser extension.

16. The method of claim 1, wherein modifying the web form comprises modifying one or more of the elements of the web form to show feedback indicative of a progress of the capturing of communication information, wherein said feedback comprises an indication of either:
a number of spoken utterances input by the customer; or
a number of SIP signals input by the customer; or
a number of DTMF key presses input by the customer; or
a number of computer-readable characters entered by the customer.

17. A communication system, comprising:
a communication channel for a customer to communicate with an agent;
data capture means situated in the communication channel between the customer and the agent, the data capture means configured to capture, from the communication channel, information input by the customer;
a server comprising at least one processor;
a computing device comprising at least one processor the computing device associated with the agent, the at least one processor of the computing device running a browser; and
a web form retrieved from a web server and displayed to the agent via the browser, the web form comprising a first element configured to receive sensitive data from a customer, wherein the first element in the retrieved web form is configured to be interacted with by the agent to automatically trigger a capture by the data capture means from the communication channel, responsively to a detected interaction, of the information input by the customer, wherein said information comprises telephony data, SMS data, or computer-readable data input by the customer, and wherein the web form is configured to be submitted by the agent to send a form data submission request directed to a payment service provider for processing;
wherein the browser comprises a browser extension configured to modify one or more elements of the web form in response to the detected interaction using a browser extension, and is configured to run code to redirect the form data submission request from the payment service provider to the server when the web form is submitted; and
wherein the at least one processor of the server is configured to make a new request to the payment service provider, having modified data in the submission to include the captured information input by the customer.

18. A communication system, comprising:
a communication channel for a customer to communicate with an agent;
data capture means situated in the communication channel between the customer and the agent, the data capture means configured to capture, from the communication channel, information input by the customer;
an intermediate system;
a server comprising at least one processor;

a computing device comprising at least one processor, the computing device associated with the agent, the at least one processor of the computing device running a browser; and a web form retrieved from a web server and displayed to the agent via the browser, the web form comprising a first element configured to receive sensitive data from a customer, wherein the first element in the retrieved web form is configured to be interacted with by the agent to automatically trigger a capture by the data capture means from the communication channel, responsively to a detected interaction, of the information input by the customer, wherein said information comprises telephony data, SMS data, or computer-readable data input by the customer, and wherein the web form is configured to be submitted by the agent to send a form data submission request directed to the intermediate system;

wherein:

a browser extension of the browser is configured to modify one or more elements of the web form in response to the detected interaction, the form data submission request identifies a payment service provider, the intermediate system is configured to redirect the request through the server, and the at least one processor of the server is configured to make a new request to the payment service provider for processing, having modified data in the submission to include the captured information input by the customer.

19. A communication system, comprising:

a communication channel between a customer and an agent for a customer to communicate with an agent;

data capture means situated in the communication channel, the data capture means configured to capture, from the communication channel, information input by the customer;

a computing device comprising at least one processor, the computing device associated with the agent, the at least one processor of the computing device running a browser; and a web form retrieved from a web server comprising at least one processor and displayed to the agent via the browser, the web form comprising an input element configured to receive sensitive data from a customer and chooseable by the agent to perform a particular action;

wherein the particular action comprises automatically sending a signal to a first server to invoke a capture by the data capture means from the communication channel, responsively to a selection of the input element by the agent, of the information input by the customer, wherein said information comprises telephony data, SMS data, or computer-readable data input by the customer, and the input element is configured to be automatically populated, by a browser extension of the browser, in response to the selection of the input element by the agent, with the captured information input by the customer.

* * * * *